US009227261B2

(12) United States Patent
Khanna et al.

(10) Patent No.: US 9,227,261 B2
(45) Date of Patent: Jan. 5, 2016

(54) VACUUM CARRIERS FOR SUBSTRATE BONDING

(71) Applicant: International Business Machines Corporation, Armonk, NY (US)

(72) Inventors: Vijayeshwar D. Khanna, Millwood, KY (US); Sri M. Sri-Jayantha, Ossining, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 151 days.

(21) Appl. No.: 13/959,867

(22) Filed: Aug. 6, 2013

(65) Prior Publication Data

US 2015/0041524 A1    Feb. 12, 2015

(51) Int. Cl.
| B23K 37/00 | (2006.01) |
| B23K 37/04 | (2006.01) |
| B23K 3/08 | (2006.01) |
| B25B 11/00 | (2006.01) |
| B23K 1/00 | (2006.01) |

(52) U.S. Cl.
CPC ............... *B23K 3/087* (2013.01); *B23K 1/0016* (2013.01); *B23K 37/0408* (2013.01); *B23K 37/0426* (2013.01); *B23K 37/0435* (2013.01); *B23K 37/0443* (2013.01); *B25B 11/005* (2013.01)

(58) Field of Classification Search
None
See application file for complete search history.

(56) References Cited

U.S. PATENT DOCUMENTS

| 2,855,653 | A | * | 10/1958 | Kastenbein | 425/110 |
| 4,557,514 | A | * | 12/1985 | Cushman et al. | 294/188 |
| 4,656,906 | A | * | 4/1987 | Mozieka et al. | 83/451 |
| 5,372,296 | A | * | 12/1994 | Konecke et al. | 228/124.6 |
| 5,410,791 | A | * | 5/1995 | Wirth et al. | 29/235 |
| 5,632,434 | A | * | 5/1997 | Evans et al. | 228/44.7 |
| 5,671,910 | A | * | 9/1997 | Davies et al. | 269/21 |
| 5,720,849 | A | * | 2/1998 | Yokosuka | H01L 21/6715 100/259 |
| 5,803,797 | A | * | 9/1998 | Piper | 451/182 |
| 5,842,690 | A | * | 12/1998 | Lee et al. | 269/21 |
| 6,019,164 | A | * | 2/2000 | Getchel et al. | 165/80.1 |
| 6,196,532 | B1 | * | 3/2001 | Otwell | 269/21 |
| 6,491,083 | B2 | * | 12/2002 | De et al. | 156/750 |
| 7,257,887 | B2 | * | 8/2007 | Lee | 29/743 |
| 7,406,759 | B2 | * | 8/2008 | Yamamoto et al. | 29/559 |

(Continued)

FOREIGN PATENT DOCUMENTS

| CN | 101728300 A | 6/2010 |
| CN | 101577240 B | 3/2011 |

(Continued)

*Primary Examiner* — Kiley Stoner
(74) *Attorney, Agent, or Firm* — Scully, Scott, Murphy & Presser, P.C.

(57) ABSTRACT

A vacuum carrier can be employed to provide a partial vacuum on a back side surface of a substrate thereby holding the substrate flat against a rigid surface of the carrier throughout the duration of a bonding process. The magnitude of vacuum can be optimized to limit the warping of the substrate during and after bonding with another substrate, and to limit the mechanical stress induced in the solder balls during cooling. The vacuum carrier can include a base plate, a seal plate with at least one opening configured to accommodate at least one substrate, and vacuum seal elements configured to create a vacuum environment that pushes the substrate against the base plate when the vacuum carrier is under vacuum. The configuration of the vacuum carrier is chosen to avoid distortion of the substrate due to the vacuum seal elements, while allowing adjustment of the magnitude of the partial vacuum.

14 Claims, 14 Drawing Sheets

(56) References Cited

U.S. PATENT DOCUMENTS

| | | | |
|---|---|---|---|
| 7,722,789 B2 * | 5/2010 | Aoki et al. | 264/102 |
| 7,845,539 B1 * | 12/2010 | Kim et al. | 228/39 |
| 7,882,997 B2 * | 2/2011 | Zakel et al. | 228/5.5 |
| 7,980,445 B2 * | 7/2011 | Budd et al. | 228/33 |
| 8,272,556 B2 * | 9/2012 | Marion | 228/44.3 |
| 8,444,127 B2 * | 5/2013 | Watson et al. | 269/21 |
| 8,627,997 B2 * | 1/2014 | Cheung et al. | 228/191 |
| 8,748,780 B2 * | 6/2014 | Moro et al. | 219/390 |
| 2001/0013532 A1 * | 8/2001 | Higashi et al. | 228/9 |
| 2002/0034928 A1 * | 3/2002 | Doan et al. | 451/285 |
| 2004/0238522 A1 * | 12/2004 | Edwards et al. | 219/444.1 |
| 2004/0262371 A1 * | 12/2004 | Coico et al. | 228/180.22 |
| 2005/0205531 A1 * | 9/2005 | Iizuka | 219/121.18 |
| 2006/0032037 A1 * | 2/2006 | Lo et al. | 29/464 |
| 2006/0134903 A1 * | 6/2006 | Boufnichel et al. | 438/614 |
| 2007/0040265 A1 * | 2/2007 | Umotoy | C23C 16/45521 257/704 |
| 2007/0105347 A1 * | 5/2007 | Besinger | C03B 33/033 438/464 |
| 2007/0158031 A1 * | 7/2007 | Miyake | 156/581 |
| 2008/0164646 A1 * | 7/2008 | Cheng et al. | 269/16 |
| 2009/0275174 A1 * | 11/2009 | Kimbara | 438/121 |
| 2010/0164155 A1 * | 7/2010 | Segawa et al. | 269/21 |
| 2011/0232075 A1 * | 9/2011 | Yamauchi | 29/559 |
| 2012/0018938 A1 * | 1/2012 | Cone et al. | 269/21 |
| 2013/0168910 A1 * | 7/2013 | Sun et al. | 269/21 |
| 2014/0014708 A1 * | 1/2014 | Chuang et al. | 228/4.5 |
| 2014/0263575 A1 * | 9/2014 | Shiratori et al. | 228/6.2 |
| 2014/0302755 A1 * | 10/2014 | Kumamoto | H01L 21/6838 451/388 |
| 2015/0118799 A1 * | 4/2015 | Khanna et al. | 438/125 |

FOREIGN PATENT DOCUMENTS

| | | | | |
|---|---|---|---|---|
| EP | 147094 A | * | 7/1985 | |
| JP | 08153992 A | * | 6/1996 | |
| JP | 3693182 B2 | | 7/2005 | |
| JP | 2010263052 A | | 11/2010 | |
| KR | 1020100034785 A | | 4/2010 | |
| WO | WO 2004073946 A1 | * | 9/2004 | B28D 5/00 |
| WO | 2010024678 A1 | | 3/2010 | |
| WO | WO 2010035786 A1 | * | 4/2010 | H01L 21/683 |

* cited by examiner

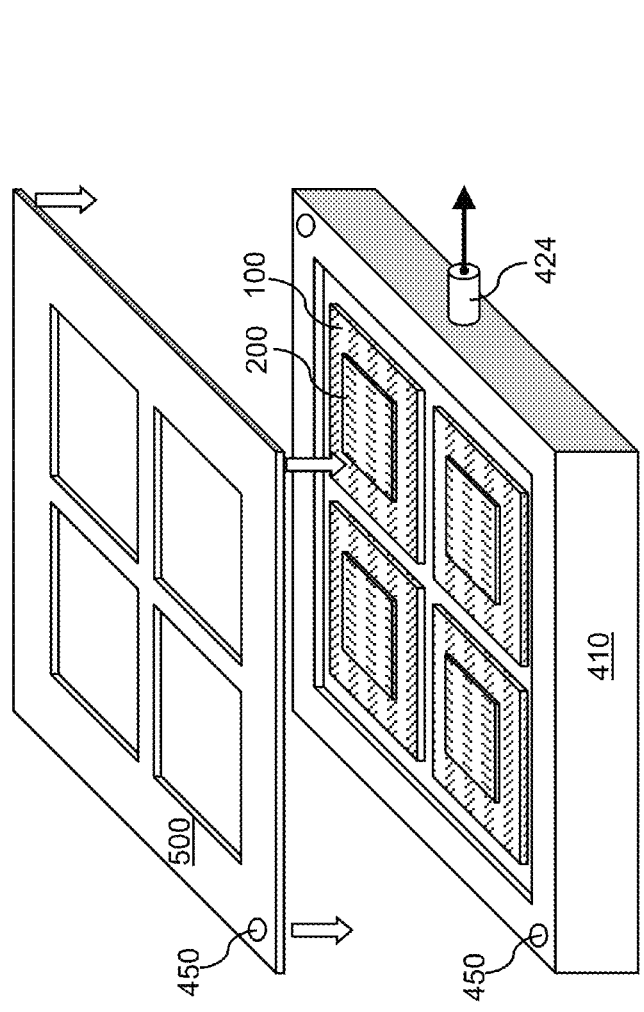
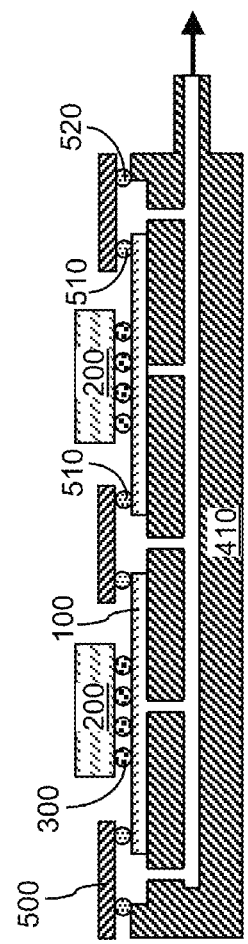
FIG. 9A
FIG. 9B

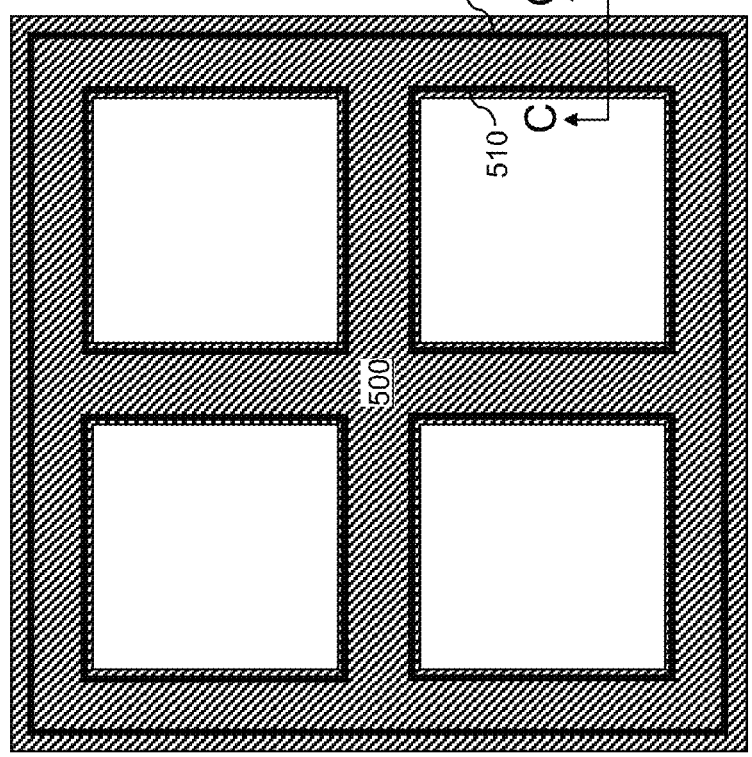

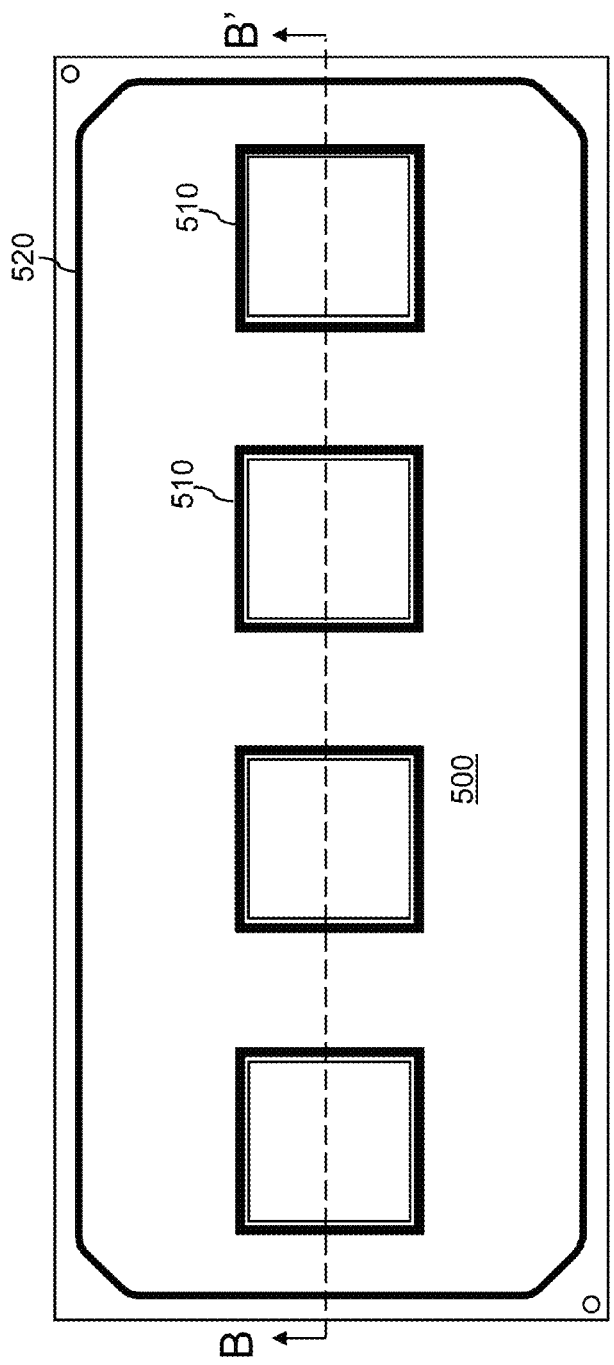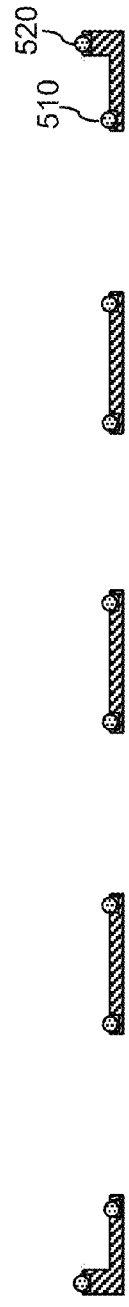
FIG. 12A
FIG. 12B

VACUUM CARRIERS FOR SUBSTRATE BONDING

RELATED APPLICATIONS

The present application is related to copending U.S. patent application Ser. No. 13/437,309 filed on Apr. 2, 2012, the entire contents of which are incorporated herein by reference.

BACKGROUND

The present disclosure relates to bonding substrates, and particularly, to a method of bonding substrates while minimizing substrate warping, a vacuum carrier for effecting the same, and a structure for implementing the same.

Substrate warping poses a challenge for the attachment of a semiconductor chip to a packaging substrate. A large substrate warp at reflow is a cause for unreliable C4 bonding, leading to potential non-wets or unequal C4 solder heights. Even for a population of substrates having a nominal mean warp, there is usually a large variation (sigma) in the warp which can be a problem during bond and assembly. The thermal warp, i.e., the change in warp with temperature, is another undesirable problem for bond and assembly. A large thermal warp means that the packaging substrate changes shape during the critical cool down period after the reflow of solder balls. Such change in the shape of the solder balls could lead to defects in the solder ball joints such as hot tears.

SUMMARY

A vacuum carrier can be employed to provide a partial vacuum on a back side surface of a substrate thereby holding the substrate flat against a rigid surface of the carrier throughout the duration of a bonding process. The magnitude of vacuum can be optimized to limit the warping of the substrate during and after bonding with another substrate, and to limit the mechanical stress induced in the solder balls during cooling. The vacuum carrier can include a base plate, a seal plate with at least one opening configured to accommodate at least one substrate, and vacuum seal elements configured to create a vacuum environment that pushes the substrate against the base plate when the vacuum carrier is under vacuum. The configuration of the vacuum carrier is chosen to avoid distortion of the substrate due to the vacuum seal elements, while allowing adjustment of the magnitude of the partial vacuum.

According to an aspect of the present disclosure, a structure includes a vacuum carrier and at least one substrate. The vacuum carrier includes a base plate, a seal plate having at least one opening, at least one first vacuum seal element, and a second vacuum seal element. The at least one substrate contacts a planar surface of the base plate and underlies each of the at least one opening. The at least one first vacuum seal element provides a seal at each gap between the at least one substrate and the seal plate. The second vacuum seal element provides another seal between the base plate and the seal plate. The vacuum carrier and the at least one substrate includes a reduced pressure environment therein.

According to another aspect of the present disclosure, a method of bonding substrates is provided. At least one stack is mounted on a vacuum carrier. Each of the at least one stack includes a first substrate, an array of solder balls, and a second substrate such that the array of solder balls is not bonded to at least one of the first substrate and the second substrate. A partial vacuum is provided within an enclosure defined by the vacuum carrier and the at least one stack. Each of the at least one first substrate is pushed against a surface of the vacuum carrier by a pressure differential between the partial vacuum and atmospheric pressure. The pressure differential is in a range from 0.4 atmospheric pressure to 1.0 atmospheric pressure. Bonding is induced within the at least one stack by reflowing the at least one array of solder balls at an elevated temperature. The at least one stack is dismounted from the vacuum carrier after the at least one stack is bonded by releasing the partial vacuum.

According to yet another aspect of the present disclosure, a vacuum carrier is provided, which is configured to hold vacuum upon mounting of at least one substrate thereupon and upon pumping out of ambient gas therefrom. The vacuum carrier includes a base plate, a seal plate, at least one first vacuum seal element, and a second vacuum seal element. The base plate includes a planar surface and a vacuum manifold, and is connected to a sealable pumping port. The seal plate has at least one opening therein and is configured to overlie the base plate. The at least one first vacuum seal element is configured to provide a seal between at least one substrate and the seal plate upon mounting of the at least one substrate on the base plate, upon placement of the at least one first vacuum seal element upon the at least one substrate and upon placement of the seal plate upon the at least one first vacuum seal element. The second vacuum seal element is configured to provide another seal between the base plate and the seal plate upon placement of the second vacuum seal element on the base plate and upon placement of the seal plate upon the second vacuum seal element.

BRIEF DESCRIPTION OF THE SEVERAL VIEWS OF THE DRAWINGS

FIG. 9A is a bird's eye view of a seventh exemplary structure including a vacuum carrier and stacks of substrates prior to placement of a seal plate according to an embodiment of the present disclosure.

FIG. 9B is a vertical cross-sectional view of the seventh exemplary structure after placement of the seal plate according to an embodiment of the present disclosure.

FIG. 10A is a bottom-up view of the seal plate of the seventh exemplary structure according to an embodiment of the present disclosure.

FIG. 10B is a side view of the seal plate of the seventh exemplary structure in FIG. 10A in an upside-down position according to an embodiment of the present disclosure.

FIG. 10C is a magnified vertical cross-sectional view of the seal plate of the seventh exemplary structure along the plane C-C' in FIG. 10A.

FIG. 12A is a bottom-up view of the seal plate of the eighth exemplary structure according to an embodiment of the present disclosure.

FIG. 12B is a side view of the seal plate of the eighth exemplary structure in FIG. 12A in an upside-down position according to an embodiment of the present disclosure.

DETAILED DESCRIPTION

Figure 1:
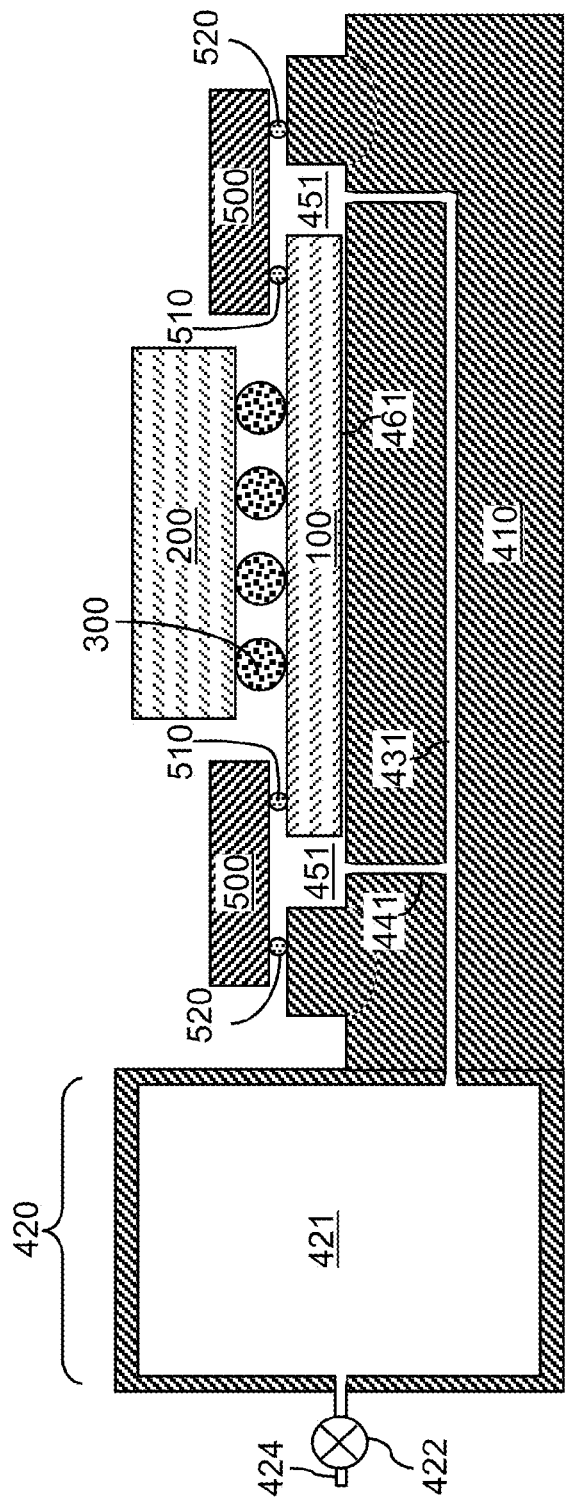
FIG. 1 is a vertical cross-sectional view of a first exemplary structure including a vacuum carrier and a stack of substrates according to an embodiment of the present disclosure.

As stated above, the present disclosure relates to a method of bonding substrates while minimizing substrate warping, a vacuum carrier for effecting the same, and a structure for implementing the same. Aspects of the present disclosure are now described in detail with accompanying figures. It is noted that like and corresponding elements are referred to by like reference numerals. The drawings are not in scale. As used herein, ordinals such as "first" and "second" are employed merely to distinguish similar elements, and different ordinals may be employed to designate a same element in the specification and/or claims.

Referring to FIGS. 1-4, a first exemplary structure, a second exemplary structure, a third exemplary structure, and a fourth exemplary structure are shown according to various embodiments of the present disclosure. Each exemplary structure includes a vacuum carrier and a stack of substrates. The vacuum carrier is configured to hold vacuum upon mounting of at least one substrate thereupon and upon pumping out of ambient gas therefrom. The vacuum carrier includes a base plate 410 including a vacuum manifold therein. The vacuum manifold can include, for example, an enclosed cavity 421 configured to hold vacuum therein and connected to a sealable pumping port 422. A cavity enclosure 420 defines the volume of the enclosed cavity 421. The portion of the base plate 410 that defines a boundary of the enclosed cavity 421 is herein referred to as a cavity enclosure 420.

In one embodiment, the cavity enclosure 420 can include two openings. A first opening in the cavity enclosure 420 provides a passage to the sealable pumping port 422. A second opening in the cavity enclosure 420 can be a connection to a vacuum distribution manifold (431, 441), which can include, for example, horizontal vacuum distribution manifold portions 431 that extend along horizontal directions and vertical vacuum distribution manifold portions 441 that extend along a vertical direction. The horizontal vacuum distribution manifold portions 431 can be embedded entirely within the base plate 410, and the vertical vacuum distribution manifold portions 441 can extend to openings in a planar top surface of the base plate 410.

Figure 3:
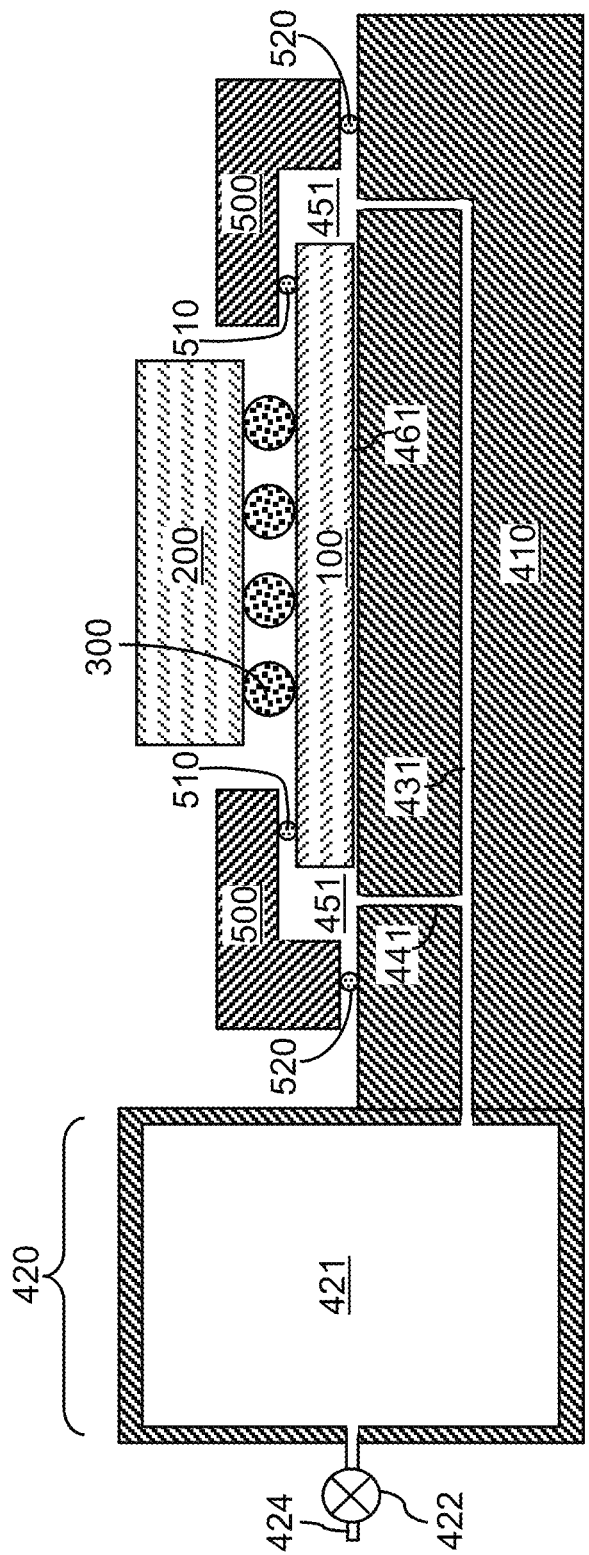
FIG. 3 is a vertical cross-sectional view of a third exemplary structure including a vacuum carrier and a stack of substrates according to an embodiment of the present disclosure.

In some embodiments, the vertical vacuum distribution manifold portions 441 can be located only in regions that do not underlie any of the at least one first substrate 100 as illustrated in FIGS. 1 and 3. The planar top surface of the base plate 410 can have a surface roughness that allows formation of channels 461 at a microscopic level through which a gas can be pumped out and so allows the vacuum to permeate beneath the at least one first substrate 100. In this case, the root mean square (RMS) surface roughness of the planar top surface of the base plate 410 that contacts the at least one first substrate 100 can be in a range from 10 nm to 10,000 nm, although lesser or greater RMS surface roughness can also be employed.

Figure 2:
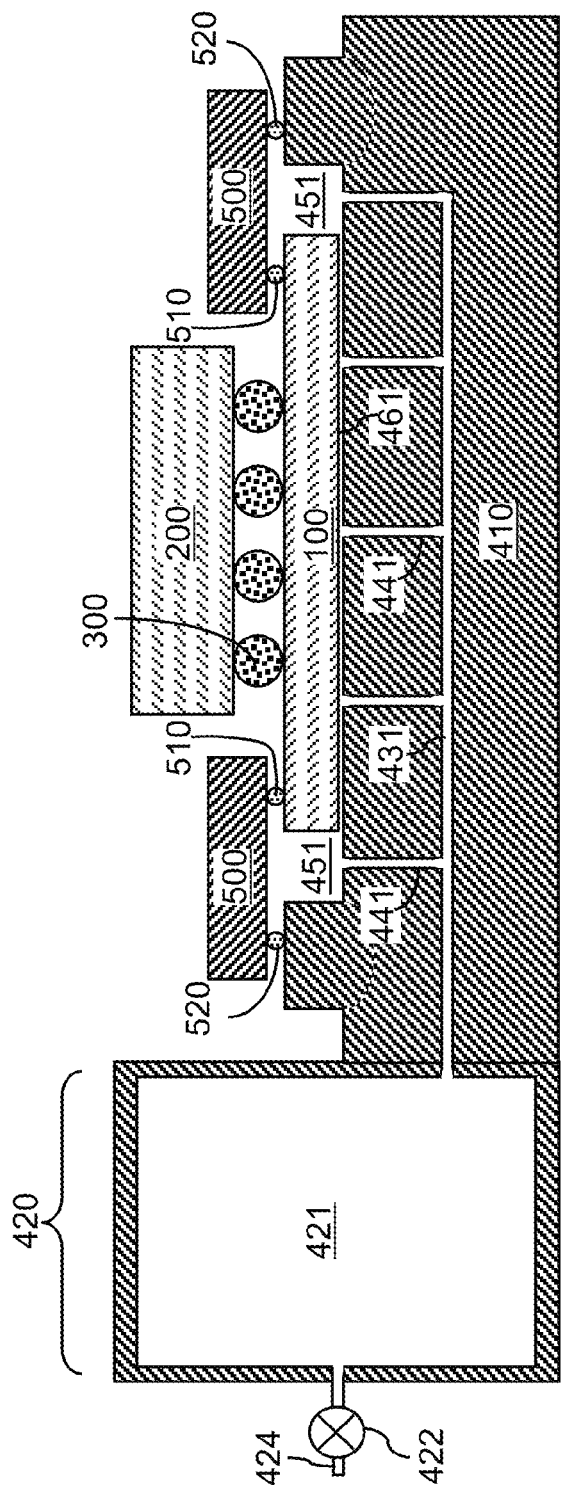
FIG. 2 is a vertical cross-sectional view of a second exemplary structure including a vacuum carrier and a stack of substrates according to an embodiment of the present disclosure.
Figure 2A:
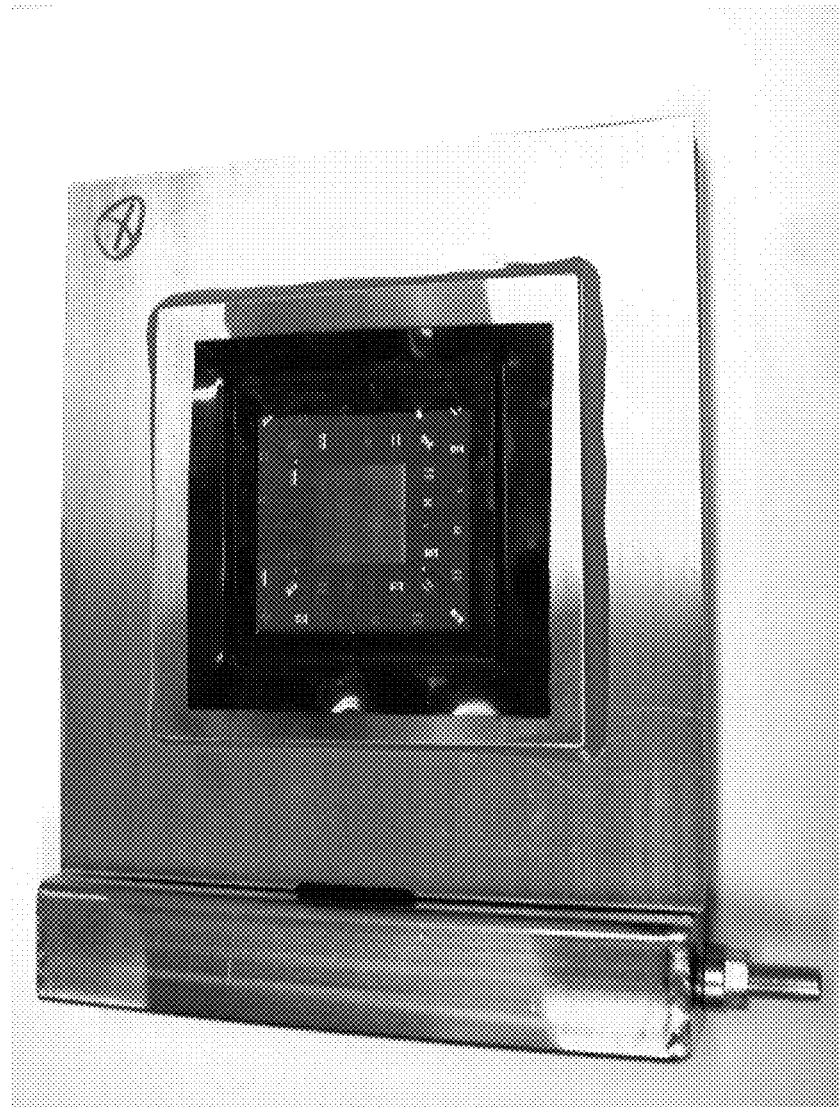
FIG. 2A is a photo of a physical implementation of the second exemplary structure.
Figure 4:
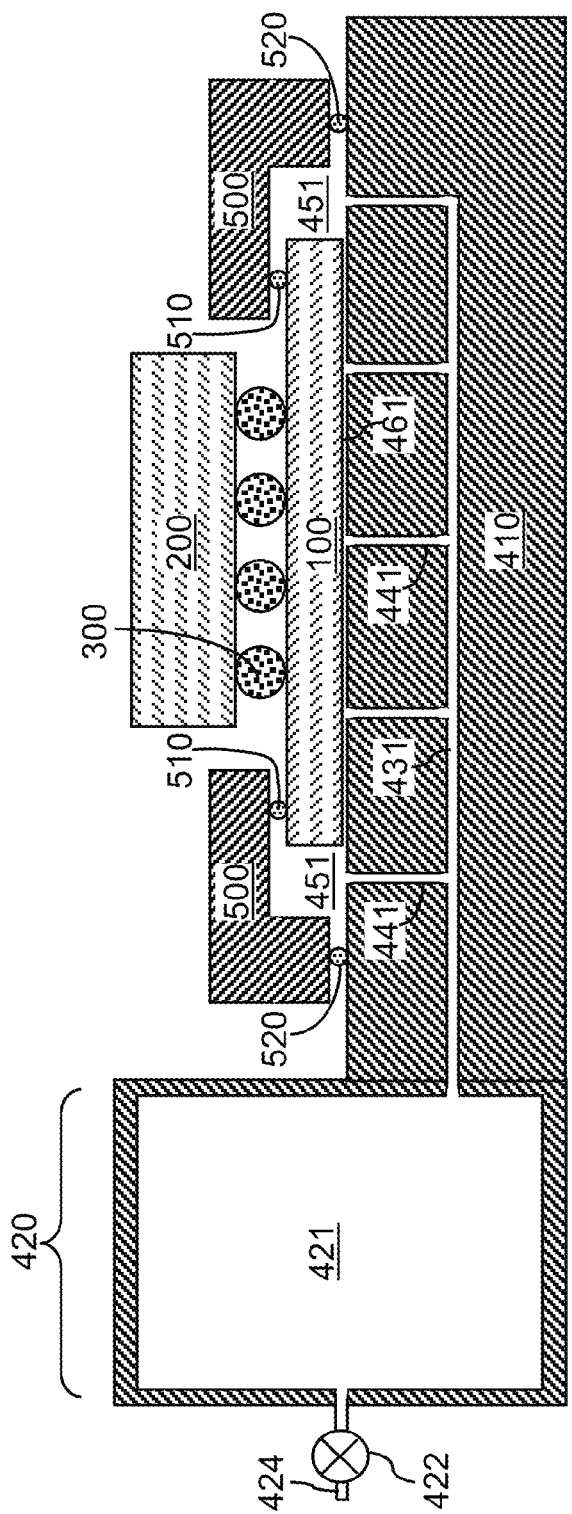
FIG. 4 is a vertical cross-sectional view of a fourth exemplary structure including a vacuum carrier and a stack of substrates according to an embodiment of the present disclosure.

In some other embodiments, the vertical vacuum distribution manifold portions 441 can also be located in regions that underlie the at least one first substrate 100 as illustrated in FIGS. 2 and 4. The planar top surface of the base plate 410 can have a surface roughness that further allows the vacuum to permeate beneath the at least one first substrate 100.

Figure 4A:
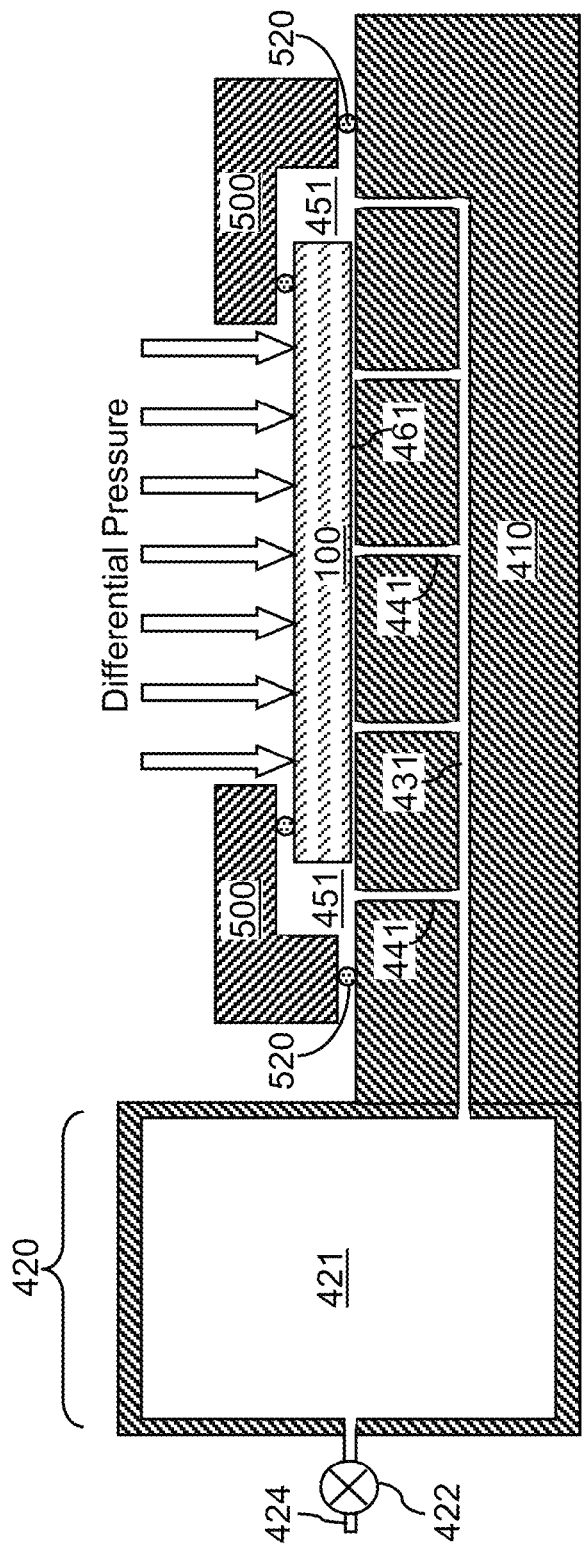
FIG. 4A is a vertical cross-sectional view of the fourth exemplary structure in which the differential pressure is schematically illustrated and a second substrate and solder balls are omitted for the sake of clarity.

In all of the above cases the pressure differential, due to the pressure of the ambient acting on the exposed top surface of the at least one first substrate 100 and the pressure of the partial vacuum acting on the complete lower surface of the at least one first substrate 100, can apply a force to the at least one first substrate 100, that presses the at least one first substrate 100 against the planar top surface of the base plate 410 as shown in FIG. 4A.

The sealable pumping port 422 includes a means of connecting, and disconnecting, a passage to an ambient that is at atmospheric pressure. One end of the sealable pumping port 422 can be connected to the enclosed cavity 421, and the other end of the sealable pumping port 422 can be connected to an orifice 424, which can be connected to a vacuum pump (not shown) for the purpose of reducing the pressure in the vacuum manifold, and can be disconnected from the vacuum pump and exposed to the atmospheric ambient at the time of releasing the vacuum in the vacuum manifold.

The planar top surface of the base plate 410 is a planar surface having an area large enough to accommodate a first substrate 100. The first substrate 100 can be a packaging substrate, a transposer substrate, an interposer substrate, or a semiconductor substrate. As used herein, a packaging substrate refers to a substrate that can be bonded to a semiconductor chip to facilitate permanent mounting of the semiconductor chip to a circuit board or an equivalent thereof. As used herein, a transposer substrate refers to a substrate that can be employed to provide temporary electrical connections between a semiconductor chip and a circuit board. As used herein, an interposer substrate refers to an intermediate substrate that provides electrical interface routing between a semiconductor chip and a packaging substrate. The semiconductor substrate can be a semiconductor chip.

While FIGS. 1-4 illustrate embodiments in which a single first substrate 100 is mounted on a vacuum carrier, embodiments are expressly contemplated herein in which a vacuum carrier can be configured to mount a plurality of first substrates 100. Thus, at least one first substrate 100 can be mounted on each vacuum carrier.

Optionally, a second substrate 200 and an array of solder balls 300 can be present on the top surface of the first substrate 100. The second substrate 200 can be a semiconductor chip configured to be mounted on the first substrate 100. Each array of solder balls 300 can be located on a top surface of a first substrate 100. Each second substrate 200 can be located on, and over, an array of solder balls 300.

In one embodiment, the bottom surface of the second substrate 200 and the top surface of the first substrate 100 can include a commensurate pattern of bonding pads (not shown) to allow bonding between the first substrate 100 and the second substrate 200 through the array of solder balls 300. The array of solder balls 300 can be, for example, C4 balls as known in the art. At this step, the array of solder balls 300 is not bonded to at least one of the first substrate 100 and the second substrate 200. In one embodiment, the array of solder balls 300 can be bonded to the first substrate 100 and not bonded to the second substrate 200. In another embodiment, the array of solder balls 300 can be bonded to the second substrate 200 and not bonded to the first substrate 100. In yet another embodiment, the array of solder balls 300 can be bonded to neither of the first substrate 100 and the second substrate 200.

Each exemplary structure can include a first substrate 100 without a second substrate thereupon, or can include a vertical stack including a first substrate 100 and a second substrate 200. Each first substrate 100 alone, if a second substrate 200 is not present thereabove, or a combination of a first substrate 100 and a second substrate 200 having an array of solder balls 300 therebetween, is herein referred to as at least one substrate (100, 200).

The vacuum carrier further includes a seal plate 500. The seal plate 500 has at least one opening therein. The number of openings in the seal plate 500 corresponds to the number of stacks of substrates that can be mounted on the base plate 410. For example, if the base plate is configured to mount N stacks of substrates (in which N is any positive integer), the seal plate 500 can include N openings such that a peripheral portion of the seal plate 500 overlies a peripheral portion of the first substrate 100. The contiguous periphery of each opening in the seal plate 500 can overlie a first substrate 100 such that, in a top-down view, a set of contiguous edges of the seal plate 500 that define the opening can be entirely within an area defined by a contiguous outer periphery of the first substrate 100.

Vacuum seal elements (510, 520) are employed to provide a vacuum environment that holds the first substrate 100 against the planar top surface of the base plate 410. The vacuum seal elements (510, 520) can be any mechanical structure that can provide an air-tight seal. For example, the vacuum seal elements (510, 520) can be o-rings or gaskets, and include a material that can withstand a thermal cycling at a reflow temperature of solder balls 300. A typical reflow temperature is in a range from 200 degrees Celsius to 280 degrees Celsius. If o-rings are employed for the vacuum seal elements (510, 520), the o-rings can be polymer-based o-rings such as Viton™ o-rings or Kalrez™ o-rings.

The vacuum seal elements (510, 520) include at least one first vacuum seal element 510 and a second vacuum seal element 520. The at least one first vacuum seal element 510 is configured to provide a seal between at least one substrate (100, 200) and the seal plate 500 upon mounting of the at least one substrate (100, 200) on the base plate 410, upon placement of the at least one first vacuum seal element 510 onto the at least one substrate (100, 200) and upon placement of the seal plate 500 upon the at least one first vacuum seal element 510. The at least one first vacuum seal element 510 can be a single vacuum seal element if only a single first substrate 100 is mounted on the vacuum carrier, or can be a plurality of vacuum seal elements if a plurality of first substrates 100 is mounted on the vacuum carrier.

The second vacuum seal element 520 is configured to provide another seal between the base plate 410 and the seal plate 500 upon placement of the second vacuum seal element 520 on the base plate 410 and upon placement of the seal plate 500 upon the second vacuum seal element 520. During mounting of each first substrate 100, the first substrate 100 is placed on the planar top surface of the base plate 410. One of the at least one first vacuum seal element 510 is placed on a top surface of the first substrate 100 such that the placed first vacuum seal element 510 contiguously extends around a periphery of the top surface of the first substrate 100 in a closed shape. As used herein, a closed shape refers to a three-dimensional shape that is topologically homeomorphic to a torus. Before, or after, placement of all of the at least one first vacuum seal elements 510, the second vacuum seal element 520 is placed on a top surface of the base plate 410. Finally, the seal plate 500 is placed on top of the at least one first vacuum seal elements 510 and the second vacuum seal element 520.

In one embodiment, the bottom surface of the seal plate 500 can be coplanar across the regions overlying the at least one first vacuum seal element 510 and across regions overlying the second vacuum seal element 520. For example, the top surface of the base plate 410 on which the second vacuum seal element 520 is placed may protrude above the top surface on which the first substrate 100 is placed as illustrated in FIGS. 1 and 2. In one embodiment, the vertical distance between the interface between the second vacuum seal element 520 and the base plate 410 and the interface between the first substrate 100 and the base plate 410 can be substantially the same as the thickness of the first substrate 100. As used herein, two dimensions are substantially the same if the difference in the two dimensions is less than 1% of the average of the two dimensions In another embodiment, the seal plate 500 can have different bottom surfaces for contacting the at least one first vacuum seal element 510 and for contacting the second vacuum seal element 520. In this case, the top surface of the base plate 410 on which the second vacuum seal element 520 is placed can be coplanar with the top surface on which the first substrate 100 is placed as illustrated in FIGS. 3 and 4. In one embodiment, a first bottom surface of the seal plate overlying the at least one first vacuum seal element could be vertically offset relative to a second bottom surface of the seal plate overlying the second vacuum seal element by an amount substantially the same as the thickness of the first substrate 100.

A cavity 451 can laterally surround each first substrate 100. Each cavity 451 is enclosed by, and is defined by, the base plate 410, the seal plate 500, the at least one first vacuum seal element 510, and the second vacuum seal element 520. The cavity 451 can be present around each of the at least one first substrate 100. Each cavity 451 can be a toroidal cavity, i.e., a cavity that is topologically homeomorphic to a torus.

During the operation of the exemplary structures, at least one stack can be mounted on the vacuum carrier. Each of the at least one stack can include a first substrate 100 by itself, or a stack of a first substrate 100, an array of solder balls 300, and a second substrate 200. A partial vacuum can be provided within an enclosure defined by the vacuum carrier and the at least one stack. As used herein, a "partial vacuum" refers to a reduced pressure environment in which the pressure is greater than 0 atmospheric pressure (atm), and is less than 0.6 atmospheric pressure. Each of the at least one first substrate 100 is pushed against a surface of the vacuum carrier by a pressure differential between the partial vacuum and atmospheric pressure. The pressure differential can be in a range from 0.4 atmospheric pressure to 1.0 atmospheric pressure.

It is well known that the pressure of an encapsulated volume increases linearly with absolute temperature. If a confined environment is sealed at room temperature (e.g., 20 degrees Celsius), heating up to a temperature around 200 degrees Celsius increases the pressure inside the confined environment by about 60%. In order to prevent the pressure of the confined environment from going above atmospheric pressure at the temperature of a reflow, the confined environment needs to start off at a pressure lower than 0.6 atmospheric pressure at room temperature.

All of the above exemplary structures can be connected to a vacuum pump via the sealable pumping port 422 and the orifice 424. The gas within the vacuum manifold (421, 431, 441) and the at least one cavity 451 can be pumped so that a reduced pressure environment is formed within the vacuum manifold (421, 431, 441) and the at least one cavity 451. In one embodiment, the sealable pumping port 422 includes a seal switch configured to isolate the vacuum manifold (421, 431, 441) and the at least one cavity 451 from the ambient in which the vacuum carrier is placed.

Once the reduced pressure environment is provided within the vacuum manifold (421, 431, 441) and the at least one cavity 451, the seal plate presses against the at least one first vacuum seal element 510 and the second vacuum seal element 520. The at least one first vacuum seal element 510 provides a seal at each gap between the at least one substrate (100) and the seal plate 500. The second vacuum seal element 520 provides another seal between the base plate 410 and the seal plate 500. Surfaces of the base plate 410 and the seal plate 500 define the outer boundary of a volume in which a vacuum environment is to be formed.

While the at least one substrate (100, 200) is pushed against the planar surface of the base plate 410 of the vacuum carrier by a pressure differential between the reduced pressure environment and the ambient at an atmospheric pressure, any of the exemplary structures can be loaded into a bonding apparatus, which can be, for example, an oven or a furnace.

Figure 5:
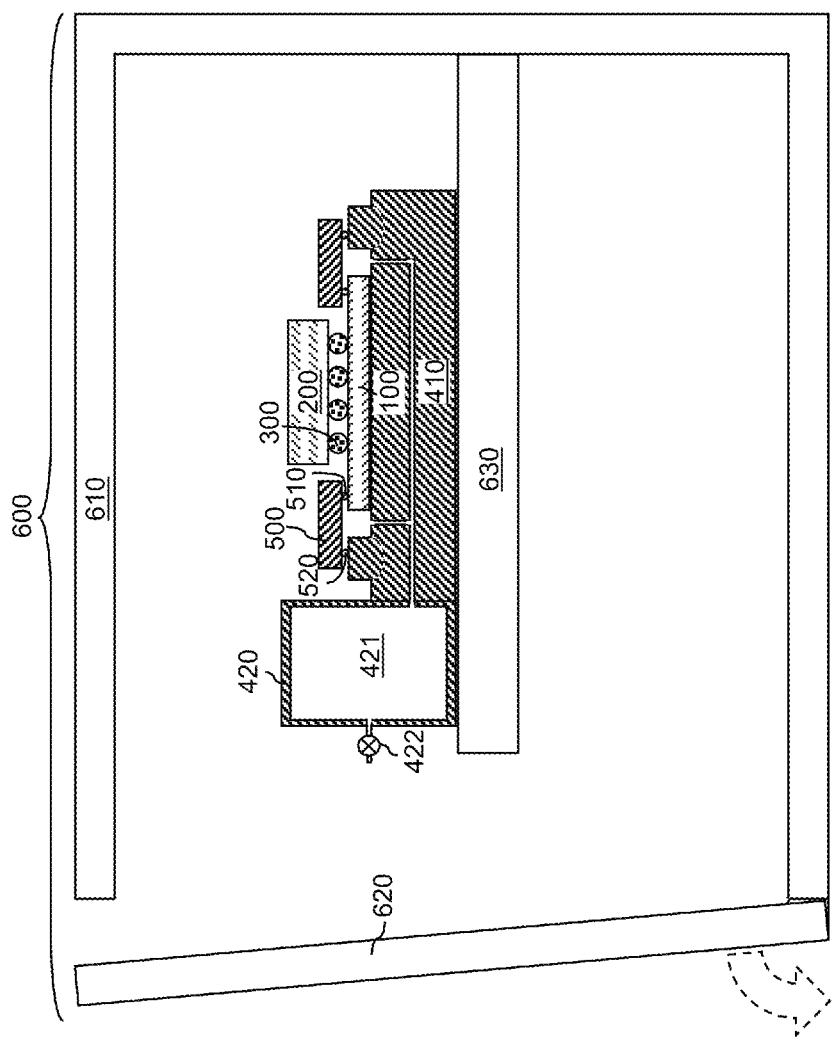
FIG. 5 is a schematic vertical cross-sectional view of an exemplary apparatus that can be employed for bonding substrates according to an embodiment of the present disclosure.

An exemplary bonding apparatus is illustrated in FIG. 5. The exemplary bonding apparatus can be a furnace including heating means (not shown explicitly). The exemplary bonding apparatus can include an enclosure 600, which includes enclosure walls 610 and a door 620, which can be configured to form a sealed volume when the door 620 is shut. The exemplary bonding apparatus can further include a shelf 630 onto which one or more of the exemplary structures of FIGS. 1-4 can be loaded. Alternatively, the enclosure 600 can be an open-ended system, such as a reflow oven, that is configured to continuously process multiple combinations of a vacuum carrier and a stack of substrates (100, 200) through a reflow process and a subsequent cool down process.

The heating means can be any type of heater element known in the art. The heating means can be embedded in the enclosure walls 610 and/or the door 620, located within the cavity of the enclosure 600, or located outside the enclosure walls 610 and the door 620. The heating means is configured to heat structures loaded within the enclosure 600. Thus, the heating means is configured to heat each stack of a first substrate 100, an array of solder balls 300, and a second substrate 200 and a vacuum carrier holding the stack simultaneously. The enclosure 600 is configured to confine heat at least during the bonding process.

Figure 6:
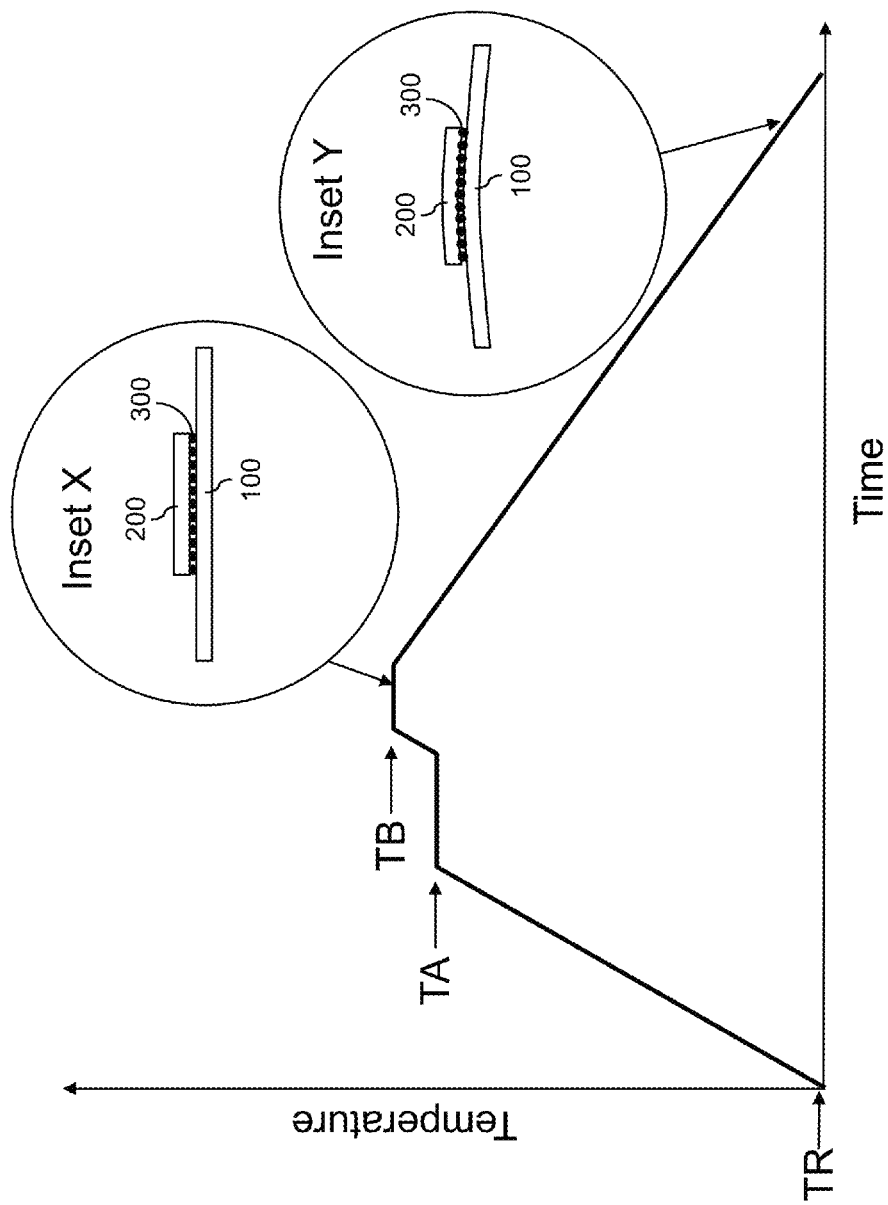
FIG. 6 is a graph illustrating the temperature of an oven as a function of time during an exemplary bonding process.

Bonding between each pair of a first substrate 100 and a second substrate 200 through an array of solder balls 300 within each of the at least one stack is induced within the bonding apparatus by heating a combination of the vacuum carrier and the at least one stack at an elevated temperature. The temperature profile of the bonding process is illustrated in FIG. 6. The combination of the vacuum carrier and the at least one stack (100, 200, 300) can start at room temperature TR, which refers to a temperature range between 10 degrees Celsius and 30 degrees Celsius.

Heating of the combination of the vacuum carrier and the at least one stack (100, 200, 300) can be performed by placing the combination within a bonding apparatus such as an oven. Upon loading of the combination of the vacuum carrier and the at least one stack (100, 200, 300) into the bonding apparatus, the temperature of the combination of the vacuum carrier and the at least one stack (100, 200, 300) can be ramped to a standby temperature TA, which can be lower than the melting temperature of the solder balls 300 by 3-30 degrees. Because each array of solder balls 300 is not bonded to at least one of the underlying first substrate 100 and the overlying second substrate 200, each first substrate 100 and each second substrate 200 can freely expand laterally during a temperature ramp step of the bonding process during which the temperature of the combination of the vacuum carrier and the at least one stack (100, 200, 300) is ramped from room temperature TR to the standby temperature TA.

Once the temperature of the combination of the vacuum carrier and the at least one stack (100, 200, 300) becomes uniform across the entire of the combination of the vacuum carrier and the at least one stack (100, 200, 300), the temperature of the combination of the vacuum carrier and the at least one stack (100, 200, 300) can be ramped to a reflow temperature TB, which can be higher than the melting temperature of the solder balls by 1-10 degrees.

The temperature of the combination of the vacuum carrier and the at least one stack (100, 200, 300) is held at the reflow temperature TB for a duration sufficient to induce reflow of each array of solder balls 300. Because each first substrate 100 is held flat against the top surface of the base plate 410 of the vacuum carrier by the combination of the differential pressure acting uniformly over the exposed top surface of each first substrate 100 and the seal plate 500 that applies a uniform pressure around the periphery of each first substrate 100, each first substrate 100 can have a substantially planar top surface at the reflow temperature as illustrated in Inset X. The duration of the reflow process can be in a range from 1 second to 60 seconds, although lesser and greater durations can also be employed.

Once each of the at least one stack (100, 200, 300) is bonded through the reflow of the solder balls 300 at the reflow step, the combination of the vacuum carrier and the at least one stack (100, 200, 300) is cooled to room temperature TR or to a temperature lower than the solidification temperature of the solder. The cooling of each bonded stack (100, 200, 300), which is also referred to as a bonded assembly (100, 200, 300), can be performed within the bonding apparatus or outside the bonding apparatus.

The reduced pressure environment is maintained within the vacuum manifold (421, 431, 441) and the at least one cavity 451 at least until the temperature of each bonded assembly (100, 200, 300) is lowered to room temperature TR, or to a temperature lower than the solidification temperature of the solder.

Since each array of solder balls 300 is bonded to the underlying first substrate 100 and the overlying second substrate 200, the first and second substrates (100, 200) cannot freely shrink laterally. Instead, the differential between the thermal expansion coefficients of the first and second substrates (100, 200) causes each bonded assembly of a first substrate 100, a second substrate 200, and an array of solder balls 300 to warp.

This warp is caused by a build up of stresses in the solder balls 300 due to the first and second substrates (100, 200) shrinking at different rates. By warping, the bonded assembly lowers the stresses that would otherwise build-up in the structure if the first and second substrates (100, 200) were not allowed to warp. The vacuum carrier restrains the warping of the stack during cool-down due to the differential pressure pushing the first substrate 100 against the base plate 410. The vacuum carrier enables a build up of a higher stress in the solder balls 300 relative to methods that allow free bending of a bonded assembly. For those structures that are vulnerable to damage by the extra build-up of stresses, it is beneficial to reduce the differential pressure in the vacuum carrier to the lowest level that is necessary to maintain the flatness of the substrates during reflow. Alternately it may be beneficial to release the vacuum during cool-down at a temperature higher than room temperature provided that the solder balls have resolidified and the stresses have not built-up to a level capable of structurally damaging the bonded assembly.

Thus, in one embodiment, the magnitude of the pressure differential between the ambient and the reduced pressure environment can be selected to allow warping of the bonded assembly (100, 200, 300) during the cool down step during which the temperature of each bonded assembly (100, 200, 300) is lowered to room temperature TR or to a temperature lower than the solidification temperature of the solder. In this case, the bonded assembly (100, 200, 300) can warp in a manner illustrated in Inset Y.

Use of the partial vacuum allows reduction of the applied force on the bonded assembly (100, 200, 300) relative to the force that would be applied to the bonded assembly (100, 200, 300) if the vacuum manifold (421, 431, 441) and the at least one cavity 451 were in full vacuum, i.e., a vacuum environment in which the total pressure is less than 0.01 atm. In one embodiment, the pressure differential across each first substrate 100 can be in a range from 0.4 atm to 0.55 atm. In yet another embodiment, the pressure differential across each first substrate 100 can be in a range from 0.55 atm to 0.7 atm. In one embodiment, the pressure differential across each first substrate 100 can be in a range from 0.7 atm to 0.9 atm. The selection of the pressure differential between the reduced pressure environment and the atmospheric ambient can be based on the stiffness and the thermal expansion coefficient mismatch between the first substrate 100 and the second substrate within each bonded assembly (100, 200, 300), and the magnitude of the maximum allowable stress in the bonded assembly (100, 200, 300). The ability to choose the pressure differential between the reduced pressure environment and the atmospheric ambient can be advantageously employed to control the force applied to the bonded assembly (100, 200, 300) during the cooling step.

It is noted that release of vacuum at a temperature greater than 100 degrees Celsius is typically required in a system employing full vacuum to hold substrates during a bonding process because the force applied to a bonded structure is proportional to the difference between the atmospheric pressure and the full vacuum. Use of partial vacuum allows delayed release of the partial vacuum at least until the temperature of each bonded assembly (100, 200, 300) is lowered to room temperature TR or to a temperature lower than 50 degrees Celsius because less force due to the pressure differential is applied to the bonded assembly (100, 200, 300) relative to a comparative exemplary system in which full vacuum is employed to hold the substrates. Thus, the release of the partial vacuum can be performed after the bonded assembly (100, 200, 300), i.e., the bonded at least one stack, cools to a temperature below the solidification temperature of the solder material of the solder balls 300.

The at least one bonded assembly (100, 200, 300) can be dismounted from the vacuum carrier after the cool down step is completed or after the temperature of the at least one bonded assembly (100, 200, 300) decreases sufficiently below the solidification temperature of the solder material of the solder balls 300. The dismounting of the at least one bonded assembly (100, 200, 300) can be performed by releasing the partial vacuum. The release of the partial vacuum can be employed, for example, employing a seal switch provided as a component of the sealable pumping port 422. The seal switch can be configured to release vacuum within the vacuum carrier upon activation of the seal switch. In one embodiment, the release of the partial vacuum can be performed after the at least one stack is taken out of the oven.

In one embodiment, the magnitude of the pressure differential can be decreased as a function of time while the bonded assembly (100, 200, 300) cools from the elevated temperature. The magnitude of the pressure differential can have an exponential decay as a function of time once the combination of the vacuum carrier and the at least one stack of substrates (100, 200) is disconnected from the vacuum pump. The time constant of the exponential decay can be in a range from 0.5 times the duration of the bonding process (i.e., from the initiation of heating to the end of cooling at which the partial vacuum can be released) to 2 times the duration of the bonding process. For example, the time constant of the exponential decay can be in a range from 5 minutes to 60 minutes.

In one embodiment, the leakage path between the enclosure including the partial vacuum and defined by the vacuum carrier and the at least one stack of substrates (100, 200) and the atmospheric ambient at the atmospheric pressure can be provided by a leak valve embedded within the sealable pumping port 422. In another embodiment, the leakage path can be provided by one or more microscopic grooves and/or rough surfaces of the base plate 410 or the seal plate 500 at which the at least one first vacuum seal element 510 and/or the second vacuum seal element 520 contacts the base plate 410 or the seal plate 520.

Figure 7:
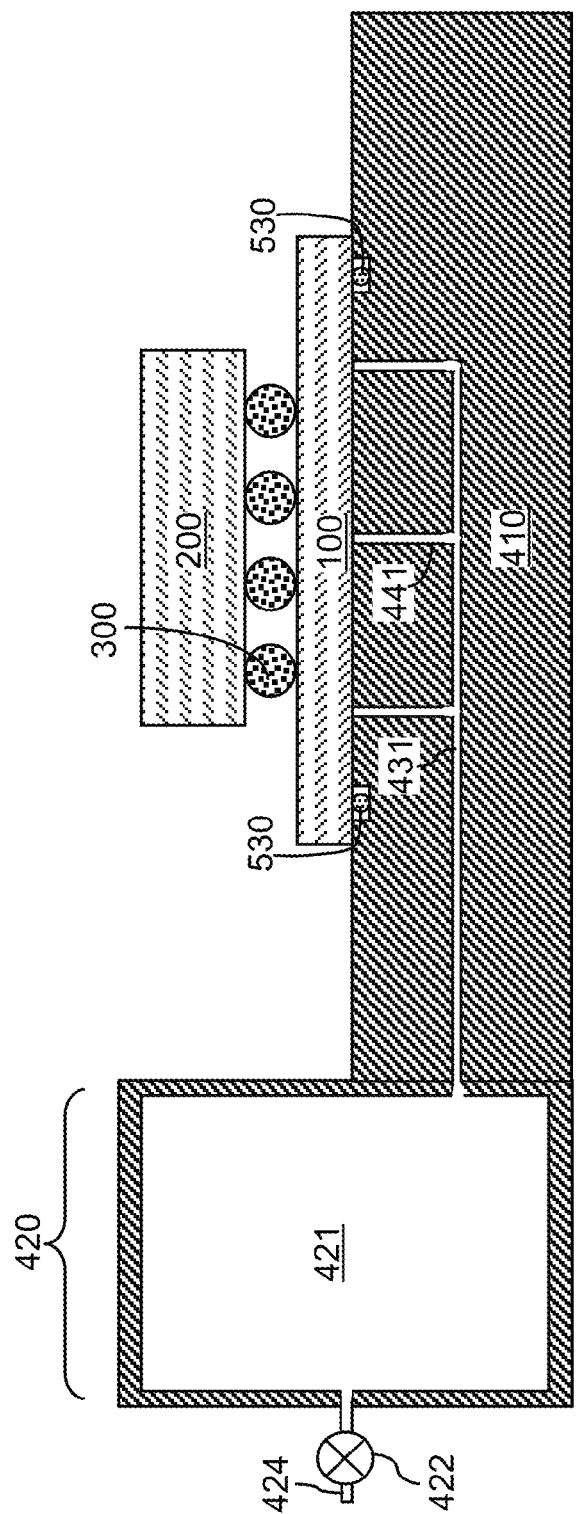
FIG. 7 is a vertical cross-sectional view of a fifth exemplary structure including a vacuum carrier and a stack of substrates according to an embodiment of the present disclosure.
Figure 8:
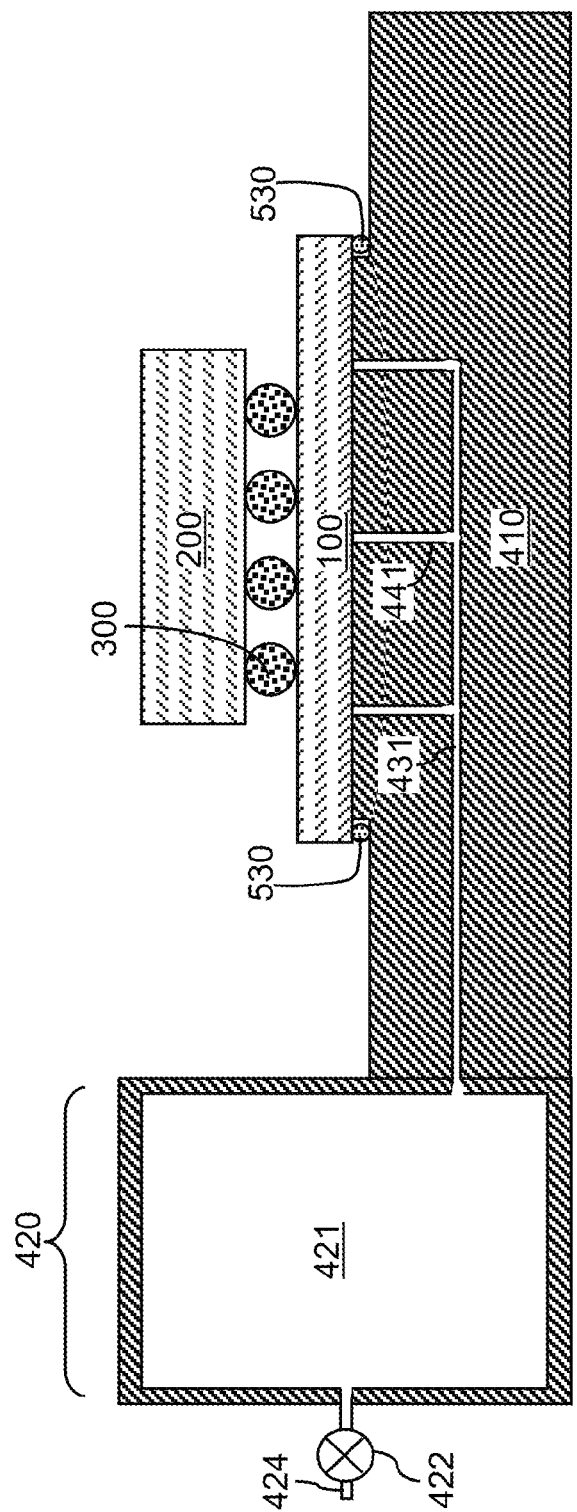
FIG. 8 is a vertical cross-sectional view of a sixth exemplary structure including a vacuum carrier and a stack of substrates according to an embodiment of the present disclosure.

The bonding process illustrated in FIGS. 5 and 6 can be performed employing different types of vacuum carriers. The vacuum carriers in the first through fourth exemplary structures provide sealing between mating surfaces of the at least one first substrate 100 and the vacuum carrier such that no bending force is applied to the first substrate(s) 100 during the reflow process. In case the at least one first substrate 100 includes any resin (as in the case of an organic packaging substrate), the resin in the at least one substrate 100 becomes soft above its glass transition temperature. With the resin in such a soft state, the at least one first substrate 100 can be easily deformed permanently by a small force. Since the effectiveness of seals requires pressure between the sealing material and the mating surfaces, it is important that the pressure be applied in a manner that does not induce deformation in the at least one first substrate 100. Within the first through fourth exemplary structures, the sealing force is applied on the at least one substrate 100 in a manner that presses the at least one first substrate 100 against the mating surface of the vacuum carrier, thereby eliminating any bending force on the at least one first substrate 100 and preventing deformation of the at least one first substrate 100. FIGS. 7 and 8 illustrate fifth and sixth exemplary structures, respectively that can be used for substrates that do not deform easily at reflow temperatures. The base plate 410 can include a recessed surface that is vertically recessed from a planar top surface that contacts the at least one first substrate 100. A vacuum seal element 530 can be placed between the recessed surface and a periphery of each first substrate 100 to provide a vacuum seal. This placement of the seal element 530 causes an unsupported upward force on the periphery of the at least one first substrate 100, which could cause deformation for materials that become soft at the reflow temperature.

FIGS. 9A, 9B, 10A, 10B, and 10C illustrate a seventh exemplary structure including a vacuum carrier and a plurality of substrate stacks (100, 200, 300). Each substrate stack (100, 200, 300) can include a first substrate 100, a second substrate 200, and an array of solder balls 300. The vacuum carrier in the seventh exemplary structure is configured to hold four substrate stacks (100, 200, 300) in a 2×2 configuration.

FIG. 10C provides a magnified view in which recessed regions in the seal plate 500 for accommodating the at least one first vacuum seal element 510 and the second vacuum seal element 520 can be placed. The recessed regions can be grooves that extend along the direction of the at least one first vacuum seal element 510 and the second vacuum seal element 520. Each groove can have a width that is at least the same as the width of the at least one first vacuum seal element 510 or the width of the second vacuum seal element 520 so that the at least one first vacuum seal element 510 or the second vacuum seal element 520 can fit into the groove. Each groove can have a depth that is less than the height of the at least one first vacuum seal element 510 and the second vacuum seal element 520 so that at least a portion of the at least one first vacuum seal element 510 or the second vacuum seal element 520 protrudes out of the bottom surface of the seal plate 500 (or the topmost surface in an upside-down view such as FIG. 10C).

Figure 11:
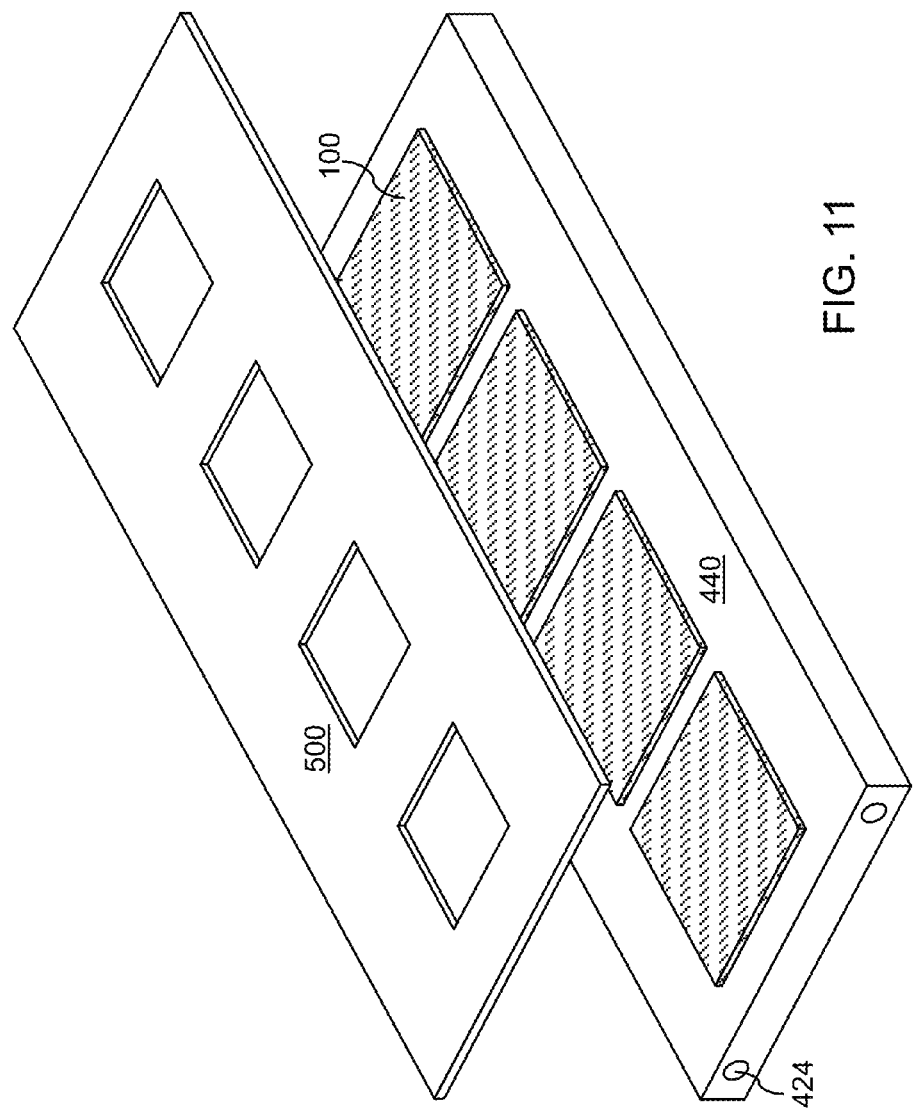
FIG. 11 is a bird's eye view of an eighth exemplary structure including a vacuum carrier and substrates prior to placement of a seal plate according to an embodiment of the present disclosure.

FIGS. 11, 12A, and 12B illustrate an eighth exemplary structure including a vacuum carrier and a plurality of substrate stacks (100, 200, 300). Each substrate stack (100, 200, 300) can include a first substrate 100, a second substrate 200, and an array of solder balls 300. The vacuum carrier in the eighth exemplary structure is configured to hold four substrate stacks (100, 200, 300) in a 1×4 configuration.

While the disclosure has been described in terms of specific embodiments, it is evident in view of the foregoing description that numerous alternatives, modifications and variations will be apparent to those skilled in the art. Each of the various embodiments of the present disclosure can be implemented alone, or in combination with any other embodiments of the present disclosure unless expressly disclosed otherwise or otherwise impossible as would be known to one of ordinary skill in the art. Accordingly, the disclosure is intended to encompass all such alternatives, modifications and variations which fall within the scope and spirit of the disclosure and the following claims.

What is claimed is:

1. A structure comprising:
a vacuum carrier including a base plate, a seal plate having at least one opening, at least one first vacuum seal element, and a second vacuum seal element; and
at least one substrate contacting a planar surface of said base plate and underlying each of said at least one opening, wherein a peripheral portion of said seal plate overlies a peripheral portion of said at least one substrate, and said at least one first vacuum seal element is situated between said peripheral portion of said seal plate and said peripheral portion of said at least one substrate, said at least one first vacuum seal element providing a seal at each gap between said at least one substrate and said seal plate, and said second vacuum seal element is situated between an opposing peripheral portion of said seal plate and said base plate said second vacuum seal element providing another seal between said base plate and said seal plate, and said vacuum carrier and said at least one substrate includes a reduced pressure environment therein.

2. The structure of claim 1, wherein said base plate includes a planar surface and a vacuum manifold, wherein said at least one substrate is pushed against said planar surface by a pressure differential between said reduced pressure environment and an ambient at an atmospheric pressure.

3. The structure of claim 1, wherein a cavity enclosed by said base plate, said seal plate, said at least one first vacuum seal element, and said second vacuum seal element is present around each of said at least one substrate.

4. The structure of claim 1, wherein said vacuum carrier comprises a vacuum manifold therein, said vacuum manifold comprising an enclosed cavity configured to hold vacuum and connected to a sealable pumping port.

5. The structure of claim 4, wherein said sealable pumping port comprises a seal switch configured to release vacuum within said vacuum carrier upon activation.

6. The structure of claim 1, wherein a bottom surface of said seal plate is coplanar across regions overlying said at least one first vacuum seal element and across regions overlying said second vacuum seal element.

7. The structure of claim 1, wherein a first bottom surface of said seal plate overlying said at least one first vacuum seal element is vertically offset relative to a second bottom surface of said seal plate overlying said second vacuum seal element.

8. The structure of claim 1, further comprising:
an array of solder balls located on a top surface of a substrate among said at least one substrate; and
another substrate located on, and over, said array of solder balls, wherein said array of solder balls is not bonded to at least one of said substrate and said another substrate.

9. A vacuum carrier configured to hold vacuum upon mounting of at least one substrate thereupon and upon pumping out of ambient gas therefrom, said vacuum carrier comprising:
a base plate including a planar surface and including a vacuum manifold and connected to a sealable pumping port;
a seal plate having at least one opening therein and configured to overlie said base plate, said at least one substrate contacting a planar surface of said base plate and underlying said at least one opening;
at least one first vacuum seal element, and a second vacuum seal element;
wherein a peripheral portion of said seal plate overlies a peripheral portion of the substrate, and said at least one first vacuum seal element is situated between said peripheral portion of said seal plate and said peripheral portion of said substrate, said at least one first vacuum seal element configured to provide a seal between at least one substrate and said seal plate upon mounting of said at least one substrate on said base plate and upon placement of said seal plate upon said at least one first vacuum seal element; and
wherein said second vacuum seal element is situated between an opposing peripheral portion of said seal plate and said base plate, said
second vacuum seal element configured to provide another seal between said base plate and said seal plate upon placement of said second vacuum seal element on said base plate and upon placement of said seal plate upon said second vacuum seal element.

10. The vacuum carrier of claim 9, wherein said base plate and said seal plate are configured to provide a cavity around each of said mounted at least one substrate upon placement of said at least one first vacuum seal element, said second vacuum seal element, and said seal plate.

11. The vacuum carrier of claim 9, wherein said vacuum manifold comprises an enclosed cavity configured to hold vacuum and connected to said sealable pumping port.

12. The vacuum carrier of claim 9, wherein a bottom surface of said seal plate is coplanar across regions overlying said at least one first vacuum seal element and across regions overlying said second vacuum seal element.

13. The vacuum carrier of claim 9, wherein a first bottom surface of said seal plate overlying said at least one first vacuum seal element is vertically offset relative to a second bottom surface of said seal plate overlying said second vacuum seal element.

14. The vacuum carrier of claim 9, wherein said sealable pumping port comprises a seal switch configured to release vacuum within said vacuum carrier upon activation.

* * * * *